Figure 1:
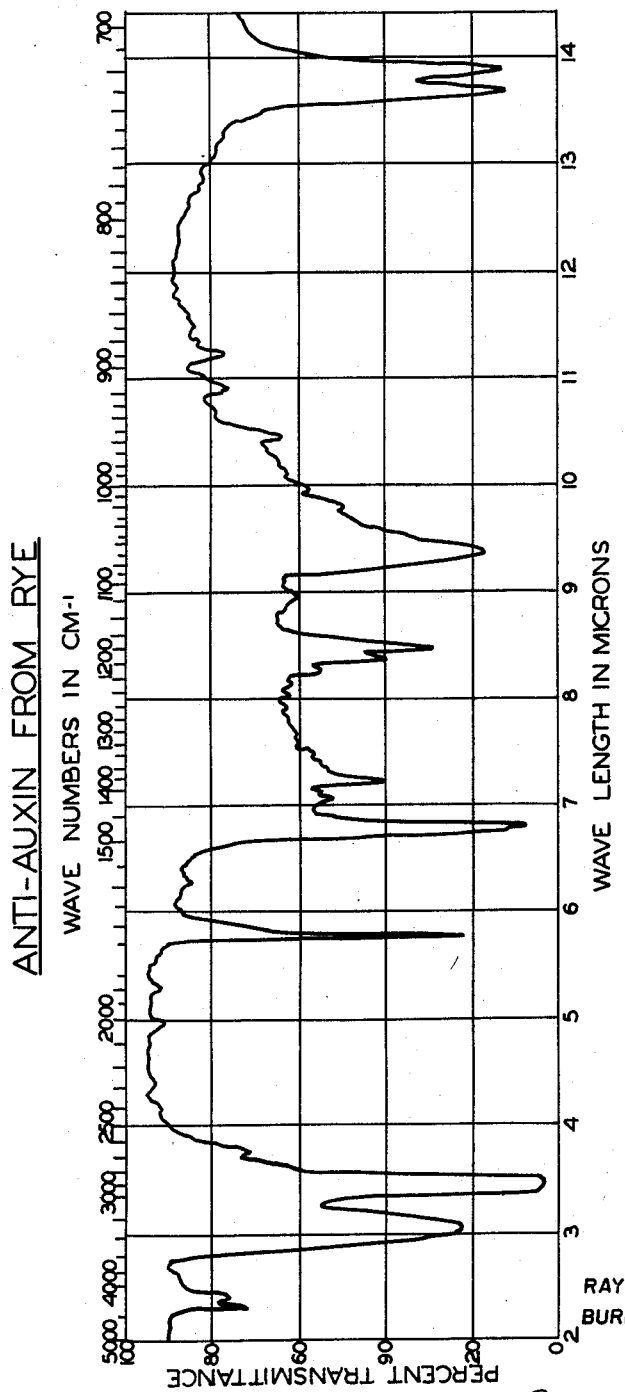

May 17, 1960

R. H. ROBERTS ET AL 2,937,206

PROCESS FOR EXTRACTION OF OIL SOLUBLE GROWTH
SUBSTANCES AND HORMONES FROM FLOWERING
PLANTS AND RESULTING COMPOSITIONS

Filed March 5, 1954

2 Sheets-Sheet 1

INVENTORS
RAY H. ROBERTS &
BURDEAN E.
   STRUCKMEYER.

BY Adams Forward McLean
ATTORNEYS

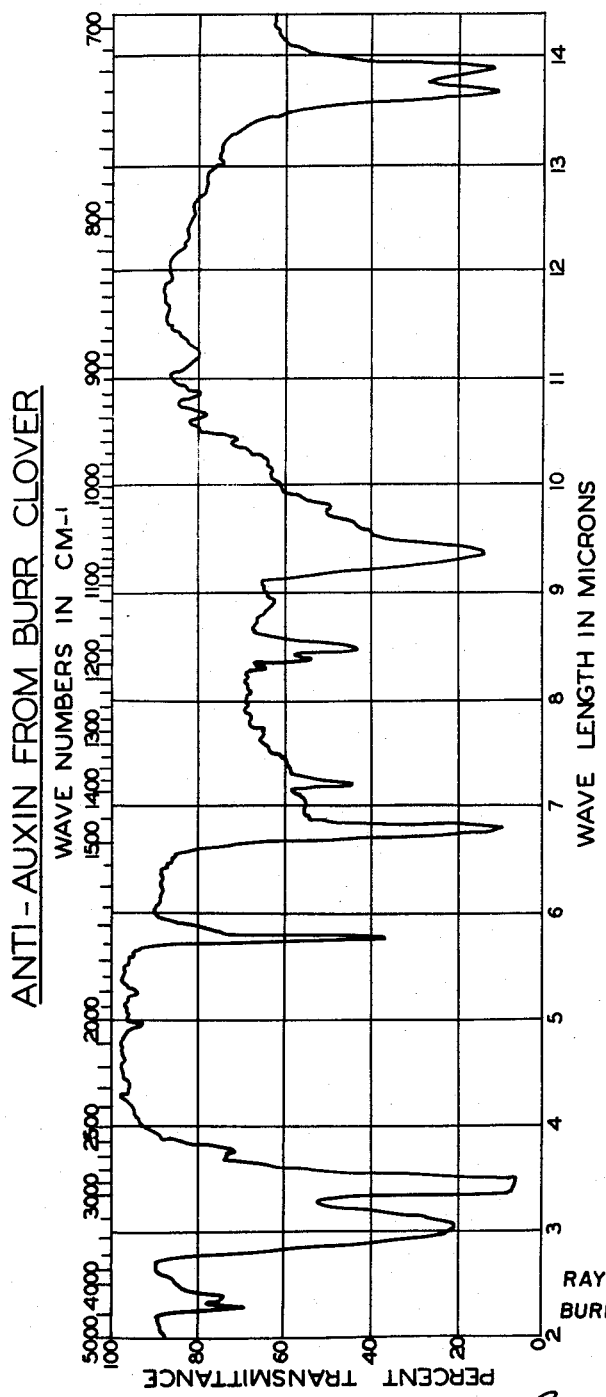

United States Patent Office 2,937,206
Patented May 17, 1960

2,937,206

PROCESS FOR EXTRACTION OF OIL SOLUBLE GROWTH SUBSTANCES AND HORMONES FROM FLOWERING PLANTS AND RESULTING COMPOSITIONS

Ray H. Roberts and Burdean E. Struckmeyer, Madison, Wis.

Application March 5, 1954, Serial No. 414,467

3 Claims. (Cl. 260—594)

The present invention relates to oil soluble growth substances and hormones obtained from flowering plants and the processes of preparing the same. More specifically the present invention relates to the recovery of an oil soluble auxin-like composition or compound and an oil soluble anti-auxin composition or compound from flowering plants, and, in particular, the latter or anti-auxin composition or compound free from said auxin-like composition or compound.

The discoveries leading to the present invention stemmed from investigations looking for the answer to the following question: Why do plants blossom? The answer to this question, agreed upon by workers who have studied the physiology of blossoming, especially as related to photoperiodism, is that plants, i.e. flowering plants, contain a chemical substance which induces flowering. Melchers, G. and Lang, A., Biol. Zentralb., 67:105 (1948). This concept up until the discoveries leading to the present invention was based particularly upon grafting experiments in which a plant in flower or a leaf from a flowering plant would induce a nonflowering plant to blossom when the two were grafted together under the proper experimental conditions. No report of a successful extraction of the blossom-inducing chemical has been made as far as known up to the time of the present invention although the hypothetical name "florigen" has been proposed for it by Cajlhajan, M., Ch., Compt. Rend. (Doklady), Acad. Sci. USSR, 18:607 (1948).

Some years ago it was reported that there was reduced cambial activity and increased maturation of tissues at the time sexual reproduction was initiated. Struckmeyer, B. Esther, Botan. Gaz., 103:182 (1941). From this it appeared that the blossom-inducing substance caused maturation of tissues in contrast to the proliferation of cells produced by the numerous growth substances, Zimmerman, P. W., Torreya 43:98 (1943), some of which are used as weed killers. Crafts, A. S., Plant Physiol. 21:345 (1946). Since the blossom-inducing substance appeared to have a physiological effect opposite to the so-called hormones, it was presumed that its extraction, if possible, should require an unlike procedure, or at least an unusual solvent.

Attempts to solve the problem and isolate "florigen" using solvents such as water, alcohol, acetone, xylol, benzol, ether, ethylacetate, petroleum ether, ethanolamine, polyethylene glycol and dioxane proved unsuccessful. With continued investigation it was then discovered that the blossom-inducing substance (florigen) could be extracted from flowering plants with a non-aromatic refined hydrocarbon fraction of the type derived from kerosene. The crude extract obtained by this extraction contained the desired anti-auxin or florigen active material, but proved to be highly contaminated with an auxin-like material as well as unwanted physiologically inactive material or materials. With continued research, these fractions were finally separated and the anti-auxin material substantially free from the auxin-like material was prepared as described below.

Illustrative flowering plants that may be used in the process of the present invention to prepare the physiologically active growth substances and hormones include alfalfa, oats, clovers, e.g. alsike, burr, crimson, sweet, white, etc., grasses, e.g. quack grass, Sudan grass, etc., tomatoes, cocklebur, rye, vetch, Indian pipe and the like. Flowering plants such as snapdragons may also be used although plants or "flowers" of this type which flower at the terminal end only are generally poorer sources of the desired compositions and their use is not preferred. In carrying out the process foliage (e.g. leaves as distinguished from fruits or seeds) is used and it is essential that the foliage be taken from flowering plants, i.e. plants starting to flower or plants in flower.

The following detailed example will serve to illustrate the invention.

Example

Leaves taken, for example, from flowering cocklebur plants are first soaked in a non-aromatic hydrocarbon solvent of the refined kerosene or well known insecticide base type. A fraction with an IBP of 387° F. and FBP of 485° F. and available on the open market and sold as Shell Dispersol is a preferred solvent. When applied to plants, insecticide base solvents of this type do not burn or kill or appreciably injure the tissue of living plants. It is not necessary to beat up or mash the foliage, the preferred operation being carried out by merely allowing the foliage to soak in the solvent. This avoids the presence of large amounts of unwanted materials being mixed with the solvent when the foliage is reduced to pulp. The soaking time may be from about 30 minutes to several hours, although soaking overnight is generally preferred. Additional active material may be recovered by re-soaking the soaked foliage as the growth substances and hormones are only partly removed by the solvent. The solvent or crude extract containing the oil soluble compositions is next separated from the foliage, e.g. by filtration or decantation, and preferably by not pressing or materially squeezing the foliage. The solvent is then cooled, e.g. placed in a deep freezer where it is cooled to around about —10° F. After several hours to two or three days in the freezer a precipitate in the form of small crystals appears. The crystals are recovered from the cold solvent by filtering and/or decanting off the solvent. The crude crystalline mass is freed from the solvent by filtering and drying. The crude product is next dissolved in warm chloroform and freed from any yellowish pigment present by means of activated or decolorizing carbon or charcoal, or by passing the chloroform solution through a pigment adsorbing column of oxides or carbonates, or by a combination of the same. The chloroform is evaporated from the resulting clear chloroform solution. The dry white crystalline product obtained is made up primarily of three fractions termed fractions A, B and C. These fractions are separated as follows:

The crystalline mixture is dissolved in warm chloroform using about 10 cc. of chloroform for every 0.2 to 0.5 gram of product. The resulting solution is then cooled to 15°–0° F. and held at this temperature until crystallization takes place. The resulting crystals are filtered off, preferably while cold, and are a mixture of fractions A and B. Fraction A is obtained substantially pure by dissolving the crystalline mixture in warm chloroform and then crystallizing by evaporation at 100° to 120° F. This fraction recovered from the chloroform liquor has optical rotation $[\alpha]_D^{26.5°} = +25.5°$. Fraction B can be secured from the chloroform solution of the original crystals by evaporation at 50° F. or lower. This fraction does not exhibit rotation. Fraction C is obtained substantially pure by evaporation of the solvent remaining after filtering off the precipitate (fractions A and B) when the original solution is chilled and held at 0° F. or lower.

Fraction A can also be obtained by extracting commercial carnauba wax with a refined hydrocarbon solvent such as Skelly Solve "B." It is obtained from the extract by the procedure described above for obtaining fraction A.

Unlike fractions A and C which are physiologically active, fraction B as far as known is inactive. In view of this it has been designated as a neutral fraction. Fraction B, however, on heating, e.g., evaporation in chloroform at 100°–120° F., is transformed to the physiologically active fraction A.

The crystallographic properties of these fractions are as follows. Fraction A is a very fine-grained aggregate with strictly anhedral character. Interferenec colors are grey to white. The refractive indices and extinction show this material to be crystalline. The indices of the plates in the horizontal position are 1.545 and 1.535. This fraction also has distinctive wavy extinction bands. Fraction B appears in two different forms. Both are most easily recognized as needles or sheaves. Those which grow within a mass are anhedral except for small multiple terminals. Those which grow on the outside of a group take on good euhedral crystal form. The crystals are very thin tablets which have low interference colors when flat and high yellow on edge. On edge they appear as needles. The crystals are probably orthorhombic showing prism and basal pinacoid faces. The habit is tabular parallel to 001. Indices: $a=Y=1.550$; $b=X=1.538$; $c=Z=1.554$.

Fraction C is refractory but is probably amorphous. It shows anomalous interference figures and interference colors as high as retardation 010. It occurs as globular masses or as scales. The refractive index is about 1.55.

Fraction A is physiologically active being anti-auxin in character, i.e. it will prevent or inhibit callus formation in plants. Fraction A, for example, when applied to a wounded plant limits, inhibits or counteracts auxin activity or auxin effects and thus provides for organized tissue growth with proper healing. In other words, fraction A acts as a plant regulator in that its presence provides for normal anatomical and physiological development of tissue. Science 117, 456 (April 24, 1953). In this it differs completely from the auxin-like fraction C, the presence of which makes for abnormal or excess tissue growth. Fraction A's effectiveness for providing organized tissue growth when applied to (e.g. sprayed on) wounded plants in dilutions as low as one part in ten thousand has been fully demonstrated. For application to wounded plants to prevent abnormal growth or callus formation, fraction A can be used as such or mixed or dispersed in liquid (oil) carriers and solvents preferably of the type of carbowax or lanolin. In addition to providing for organized or normal cell growth in plants, fraction A or a composition containing A may be employed for the partial induction of flowering of some non-flowering plants. It appears that fraction A belongs to the physiological complex associated with blossom initiation rather than the preceding period of floral induction. Fraction B is physiologically inactive, as judged by present screening methods.

The crude crystalline pigment-free or decolorized mass containing fractions A, B and C described above may also be fractionated or separated by other means such as high vacuum distillation, and chromatographic adsorption (see U.S. Patent 2,487,574), etc. Based on the presently available C, H and O analyses (carried out by the Clark Microanalytical Laboratory of Urbana, Illinois) and infrared absorption spectra, fraction A extracted from rye has been assigned the following general formula: $CH_3 \cdot (CH_2)_{36} \cdot C=O \cdot CH_2OH$. Fraction A from other flowering plants is believed to have the same or similar structures. This is exemplified by infrared spectra of fraction A obtained from rye and fraction A obtained from burr clover which are shown, respectively, in Figures 1 and 2. Characteristic absorption bands expressed in reciprocal centimeters are found in fractions A at the following frequencies: 4200, 3400, 2900–2800, 1725, 1475, 1380, 1180, 1070, 735 and 720. The strongest bands are at 3400, 2900–2800, 1725, 1475, 1070, 735 and 720. In wave lengths in microns the bands are: 3.05; 3.45; 5.79; 6.80; 7.23; 8.48; 9.35; 13.67 and 13.88. The infrared spectra were recorded using Baird Associates double beam recording infrared spectrophotometer with sodium chloride prism. Solid films of the samples were prepared for examination by fusing the material between sodium chloride plates.

It should be understood that the anti-auxin substance (fraction A) of the present invention does not increase cell proliferation but induces maturity and differs radically in this respect from growth substances isolated heretofore. The prior growth substances, for example, when applied to plants like the well known 2,4–D compound, results in proliferation of cells. For optium operations the anti-auxin compound or composition should be free from the hormone or auxin-like materials, as fraction C.

We claim:

1. The process which comprises soaking foliage of a flowering plant in a refined kerosene hydrocarbon solvent, separating the solvent from the foliage, cooling the solvent to about −10° F., separating the pigment contaminated crystalline material containing anti-auxin and auxin products which forms on standing in the cool solvent from the solvent, removing pigmenting substances from the crystalline material, and fractionating the decolorized crystalline material containing both anti-auxin and auxin-like products to obtain the anti-auxin product substantially free from the auxin-like product.

2. The process of claim 1 where the decolorized crystalline material is dissolved in warm chloroform and fractionally separated by lowering the temperature of the resulting solution to about 0–15° F. to yield an anti-auxin fraction (A), and a physiologically inactive fraction (B), separating the resulting precipitate from the chloroform solution containing auxin-like material, dissolving the precipitate in fresh warm chloroform and recovering the anti-auxin fraction by evaporation at 100–120° F.

3. A product produced by the process of claim 2 characterized by the general formula $$CH_3 \cdot (CH_2)_{36} \cdot C=O \cdot CH_2OH$$

a specific rotation of $[\alpha]_D^{26.5}$ +25.5° and exhibiting characteristic strong absorption bands in the infrared region of the spectrum when fused between sodium chloride at the following frequencies expressed in reciprocal centimeters: 3400, 2900–2800, 1725, 1475, 1070, 735 and 720; said product being characterized by anti-auxin activity in that it inhibits callus formation in plants and substantial freedom from products characterized by auxin activity in that they increase cell proliferation in plants.

References Cited in the file of this patent

Kogl et al.; Z. phsiol. Chem., vol. 216, pp. 31–44 (1933) as abstracted in Chem. Asbstr., vol. 27, page 2461 (1933).

Kramer et al.: Plant Physiol, vol. 24, pp. 207–221 (1949) as abstracted in Chem. Abstr., vol. 43, col. 4733 (1949).

Sirvonval: Bull. classe sci. Acad, roy. Belg., vol. 36, pp. 779–783 (1950), as abstracted in Chem. Abstr., vol. 45, col. 6698 (1951).

Roberts: Science, vol. 117, pp. 456–7, April 24, 1953.